US008825910B2

(12) United States Patent
Campbell et al.

(10) Patent No.: US 8,825,910 B2
(45) Date of Patent: Sep. 2, 2014

(54) PASS-THROUGH CONVERGED NETWORK ADAPTOR (CNA) USING EXISTING ETHERNET SWITCHING DEVICE

(75) Inventors: Alexander P. Campbell, Kanata (CA); David Iles, San Jose, CA (US); Keshav G. Kamble, Fremont, CA (US); Dar-Ren Leu, San Jose, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 13/441,641

(22) Filed: Apr. 6, 2012

(65) Prior Publication Data
US 2013/0268694 A1    Oct. 10, 2013

(51) Int. Cl.
*G06F 3/00* (2006.01)
(52) U.S. Cl.
USPC ............................... 710/8; 370/464
(58) Field of Classification Search
None
See application file for complete search history.

(56) References Cited

U.S. PATENT DOCUMENTS

| | | | |
|---|---|---|---|
| 7,480,303 B1 * | 1/2009 | Ngai | 370/395.5 |
| 7,983,257 B2 | 7/2011 | Chavan et al. | |
| 2004/0081104 A1 * | 4/2004 | Pan et al. | 370/254 |
| 2006/0172742 A1 * | 8/2006 | Chou et al. | 455/450 |
| 2009/0154469 A1 | 6/2009 | Winter | |
| 2010/0232419 A1 | 9/2010 | Rivers | |
| 2010/0250823 A1 * | 9/2010 | Suganuma | 710/316 |
| 2011/0022935 A1 | 1/2011 | McDaniel | |
| 2011/0058573 A1 | 3/2011 | Balakavi et al. | |
| 2011/0135303 A1 | 6/2011 | Hufferd | |
| 2011/0185370 A1 | 7/2011 | Tamir et al. | |
| 2012/0002668 A1 * | 1/2012 | Lariviere et al. | 370/355 |
| 2012/0140626 A1 * | 6/2012 | Anand et al. | 370/235 |
| 2012/0281540 A1 * | 11/2012 | Khan et al. | 370/241 |
| 2012/0331119 A1 * | 12/2012 | Bose et al. | 709/223 |

FOREIGN PATENT DOCUMENTS

| | | |
|---|---|---|
| EP | 2222033 A1 | 8/2010 |
| WO | 2010/105092 A1 | 9/2010 |

OTHER PUBLICATIONS

Kale et al., "Fibre Channel over Ethernet: A Beginners Perspective," 2011 IEEE, IEEE—International Conference on Recent Trends in Information Technology, ICRTIT 2011, MIT, Anna University, Chennai, Jun. 3-5, 2011, pp. 438-443.

* cited by examiner

*Primary Examiner* — Elias Mamo
(74) *Attorney, Agent, or Firm* — Zilka-Kotab, PC

(57) ABSTRACT

According to one embodiment, a switch system includes a peripheral component interconnect express (PCIe) interface block coupled to a plurality of PCIe ports, the plurality of PCIe ports being adapted for coupling to one or more external PCIe devices, wherein the PCIe interface block includes logic adapted for providing direct memory access (DMA) for each PCIe lane thereof, multiple switched Ethernet ports adapted for coupling to one or more external Ethernet devices, switching logic adapted for switching between the multiple switched Ethernet ports and the plurality of PCIe ports, and a local processor coupled to the PCIe interface block. The external host includes a pass-through PCIe adaptor coupled to the switch system via a PCIe port. Other systems, computer program products, and methods are described according to more embodiments.

17 Claims, 5 Drawing Sheets

PASS-THROUGH CONVERGED NETWORK ADAPTOR (CNA) USING EXISTING ETHERNET SWITCHING DEVICE

BACKGROUND

The present invention relates to network switching, and more particularly, this invention relates to a network switch making use of a pass-through converged network adaptor (CNA).

Ethernet switches allow multiple hosts with Ethernet network interface cards (NICs) to be connected together. All the interconnected entities, including the Ethernet switches, exchange Ethernet packets for communications. However, in many switching systems, it may become advantageous to connect external hosts using peripheral component interconnect express (PCIe) plug-in cards to communicate with each other and/or control a portion or the whole of the switching system. Using current Ethernet switching systems and Ethernet switches, it is difficult to properly interconnect PCIe hosts and Ethernet hosts together on the same switching system.

SUMMARY

In one embodiment, a system includes an external host connected via a PCIe port to a switch system, the external host having a processor and being configured for performing functionality of a management plane and a control plane for the switch system.

In another embodiment, a computer program product includes a computer readable storage medium having computer readable program code embodied therewith, the computer readable program code including computer readable program code configured for performing functionality of a management plane and a control plane for a switch system using a processor of an external host.

In yet another embodiment, a system includes a switch system that includes a PCIe interface block coupled to a plurality of PCIe ports, the plurality of PCIe ports being adapted for coupling to one or more external PCIe devices, wherein the PCIe interface block includes logic adapted for providing direct memory access (DMA) for each PCIe lane thereof, multiple switched Ethernet ports adapted for coupling to one or more external Ethernet devices, switching logic adapted for switching between the multiple switched Ethernet ports and the plurality of PCIe ports, and a local processor coupled to the PCIe interface block, wherein the external host includes a pass-through PCIe adaptor coupled to the switch system via a PCIe port.

According to yet another embodiment, a system includes an external host coupled to either a PCIe port or an Ethernet port of a switch system, the external host being configured for performing functionality of a management plane and a control plane for a switch system and including a processor, wherein the external host is configured for programming the switching logic of the switch system to handle communications between devices connected to the plurality of PCIe ports, devices connected to the multiple switch Ethernet ports, and a first device connected to a PCIe port and a second device connected to an Ethernet port, and wherein the external host is configured for communicating via any communications protocol that is supported by the switch system via DMA.

Other aspects and embodiments of the present invention will become apparent from the following detailed description, which, when taken in conjunction with the drawings, illustrate by way of example the principles of the invention.

DETAILED DESCRIPTION

Figure 1:
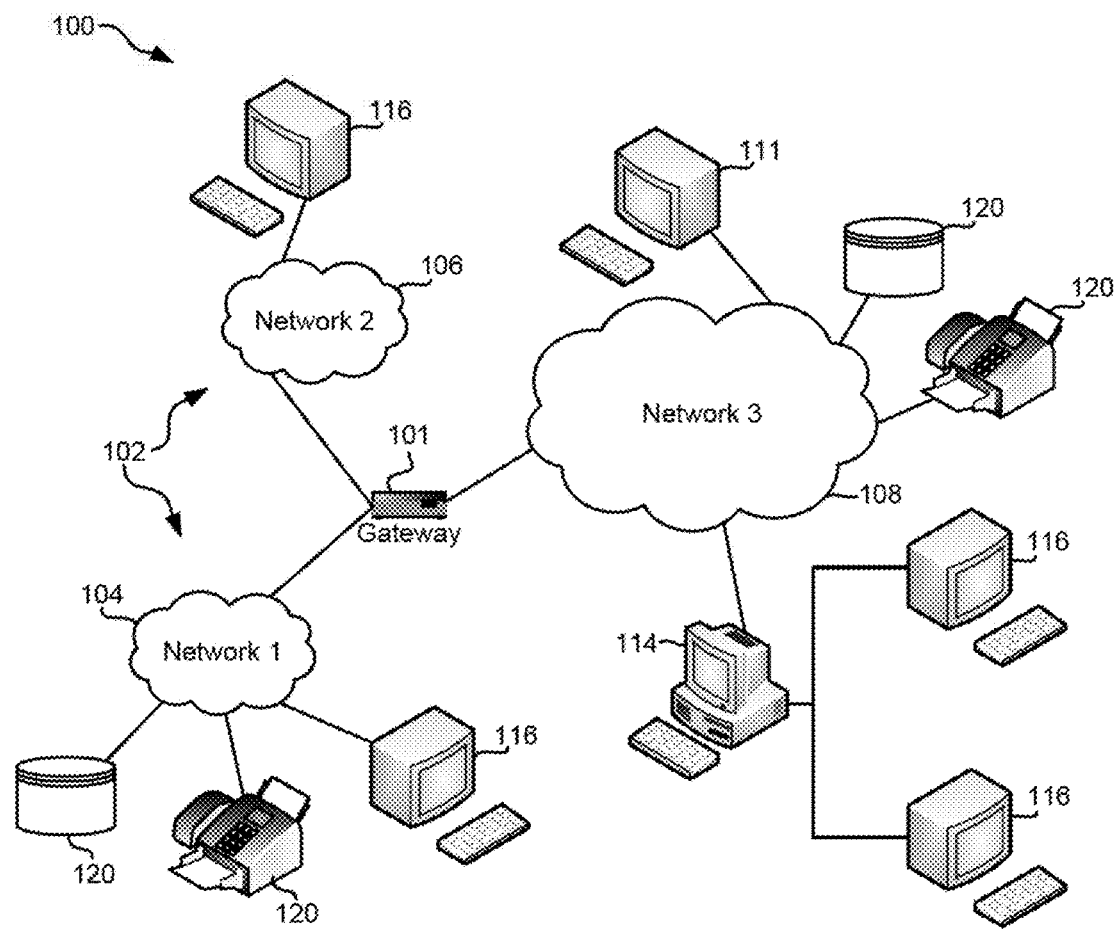
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of a system architecture that allows for interconnecting external hosts to one or more Ethernet switches using peripheral component interconnect express (PCIe) ports, for interconnected PCIe hosts to communicate with other PCIe hosts and Ethernet hosts, and/or for external PCIe hosts to mount a switching device in address space and control all or a portion of the switching device.

In one general embodiment, a system includes an external host connected via a PCIe port to a switch system, the external host having a processor and being configured for performing functionality of a management plane and a control plane for the switch system.

In another general embodiment, a computer program product includes a computer readable storage medium having computer readable program code embodied therewith, the computer readable program code including computer readable program code configured for performing functionality of a management plane and a control plane for a switch system using a processor of an external host.

In yet another general embodiment, a system includes a switch system that includes a PCIe interface block coupled to a plurality of PCIe ports, the plurality of PCIe ports being adapted for coupling to one or more external PCIe devices, wherein the PCIe interface block includes logic adapted for providing direct memory access (DMA) for each PCIe lane thereof, multiple switched Ethernet ports adapted for coupling to one or more external Ethernet devices, switching logic adapted for switching between the multiple switched Ethernet ports and the plurality of PCIe ports, and a local processor coupled to the PCIe interface block, wherein the external host includes a pass-through PCIe adaptor coupled to the switch system via a PCIe port.

According to yet another general embodiment, a system includes an external host coupled to either a PCIe port or an Ethernet port of a switch system, the external host being configured for performing functionality of a management plane and a control plane for a switch system and including a processor, wherein the external host is configured for programming the switching logic of the switch system to handle communications between devices connected to the plurality of PCIe ports, devices connected to the multiple switch Ethernet ports, and a first device connected to a PCIe port and a second device connected to an Ethernet port, and wherein the external host is configured for communicating via any communications protocol that is supported by the switch system via DMA.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
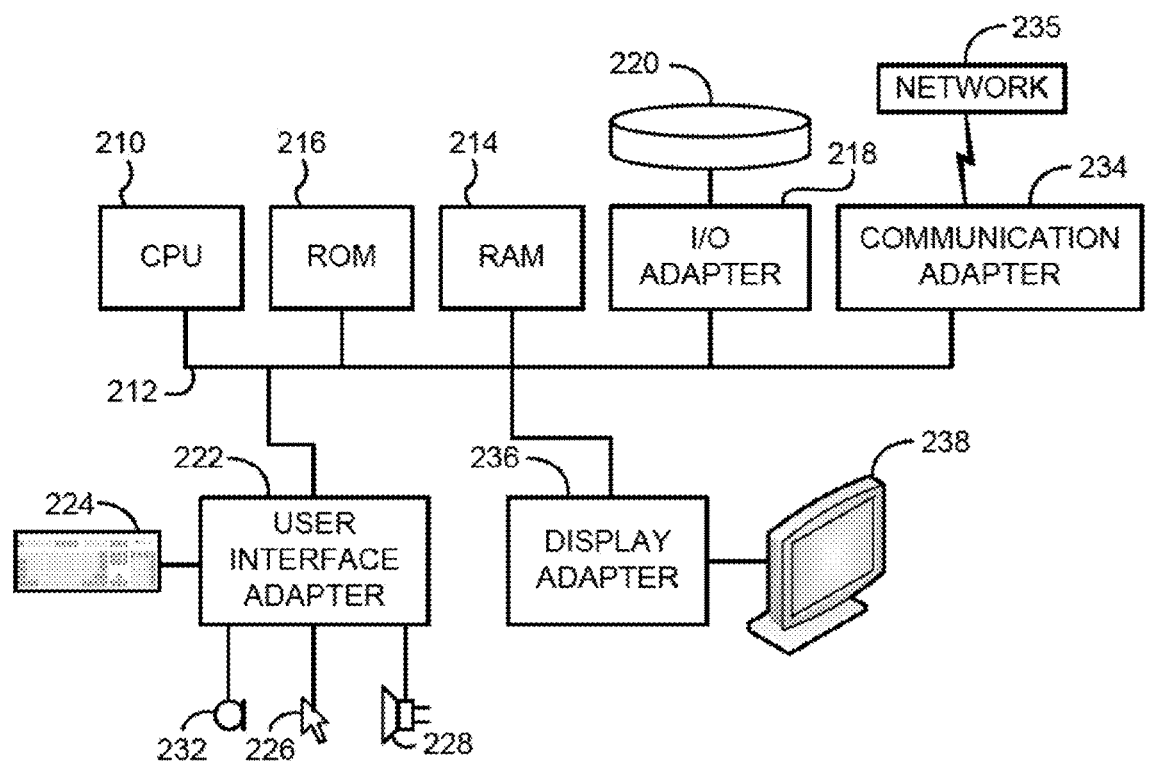
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit 210, such as a microprocessor, and a number of other units interconnected via a system bus 212, according to one embodiment.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Each server, host, computer, etc., generally includes a network interface card (NIC). The NIC acts as an Ethernet port, so for example with a laptop computer, only one NIC is typically available, which may be 1G capable, along with a wireless interface, which may be a WLAN card. However, 1G is not capable of providing sufficient bandwidth for use in a typical server, which includes large amounts of computing power. Therefore, typical servers include 10G, 40G, or even 100G capability. This is typically accomplished by having the NIC positioned on a PCIe bus.

Figure 3:
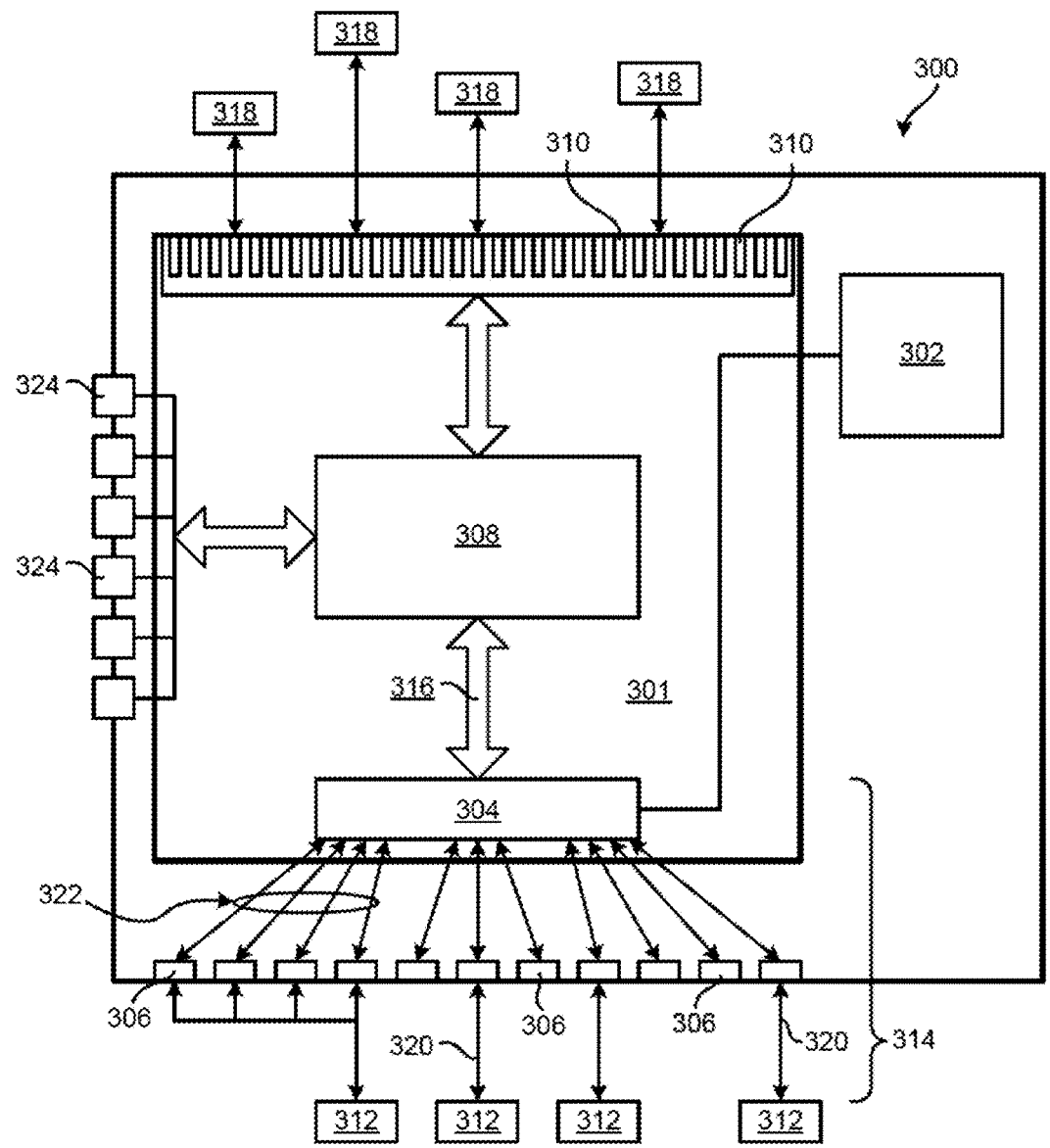
FIG. 3 is a simplified diagram of a switch system, according to one embodiment.

Now referring to FIG. 3, a switch system 300 is shown according to one embodiment. The switch system 300 may be a distributed line card (DLC) system having multiple fabric ports 324 therein and logic or functionality for switching these fabric ports 324, according to one embodiment. In other embodiments, the switch system 300 may have the components of a standard Ethernet switch, but with advanced logic and switching facilities, as described herein according to various embodiments.

As shown in FIG. 3, the switch system 300 comprises a local processor 302, such as a microprocessor, central processing unit (CPU), application specific integrated circuit (ASIC), field programmable gate array (FPGA), etc., which is coupled to a PCIe interface block 304. The PCIe interface block 304 is coupled to a plurality of PCIe slots or ports 306 (for the sake of clarity, although implementation may be different, in these descriptions, the PCIe connections are referred to as PCIe ports), with each PCIe port 306 being adapted for coupling to one or more external PCIe devices 312. The switch system also comprises multiple switch Ethernet ports 310 adapted for coupling to one or more external Ethernet devices 318 and switching logic 308 adapted for switching between the multiple switched Ethernet ports 310 and the plurality of PCIe ports 306 (and the plurality of fabric ports 324, if they are present) using DMA.

The PCIe interface block 304 comprises logic adapted for providing DMA 316 for each PCIe lane 320 thereof, which may exist on one or multiple PCIe ports 306, as described in more detail below. Some or all of these components may be included on a single chip 301, such as an integrated circuit (IC) or some other device, as would be known to one of skill in the art upon reading the present descriptions. In one embodiment, the PCIe interface block 304 (and possibly the plurality of PCIe ports 306 or at least connections thereto), the switching logic 308, the multiple switched Ethernet ports (or at least connections thereto), and the DMA facility 316 may be present on a single chip 301.

These components allow for switching logic 308 to switch between the switched Ethernet ports 310 and the plurality of PCIe ports 306. The PCIe ports 306 may be coupled or otherwise electrically connected to one or more external devices, hosts, or servers 312 (referred to herein as external devices) via external PCIe lanes 320, which may comprise conductive metal such as copper, optical cabling such as fibre channel (FC), etc. In more approaches, a single external device 312 may be connected to multiple PCIe ports 306 configured for coupling with an external device 312 via one or more external PCIe lanes 320 based on a desired communication bandwidth, e.g., via external PCIe lanes 320 ×4, ×8, etc., such as via multiple connections or a multi-connection having connections for multiple PCIe lanes 320. This group of PCIe ports 306 may be referred to as a bundle 322 of PCIe ports. In one approach, Link Aggregation (LAG) may be used, as understood by one of skill in the art.

The switching logic 308 may be embodied as hardware, software, or a combination of hardware and software, according to various embodiments. In use, hardware embodiments tend to execute functionality faster and more efficiently than software embodiments, but typically do not have the ease with which software may be updated over time.

In one example, according to conventional systems, a data center server may have one or more PCIe ports which may be used for NICs, which are capable of providing, for example, 40G network bandwidth. This results in 40G Ethernet being provided through the PCIe ports to the switch system, and then being processed by the switching logic (which may include an Ethernet controller). When any processing is to be performed by the local processor, it uses PCIe to locate any resources necessary on the network over Ethernet, and then is able to transmit the Ethernet packet to any other external PCIe hosts or other systems connected to the multiple switched Ethernet ports, in some approaches. In this way, the 40G Ethernet controller is mapped onto the PCIe.

It is noted that a 40G NIC may cost about $5,000 to about $40,000 or more at present, and the network connectivity coupling the 40G NIC to one of the 40G switches is also expensive. Therefore, a lot of complicated and expensive processes, both monetarily and temporally, add to a lot of latency. When a packet or a transmit packet is to be read, it basically goes into the PCI interface on the 40G switch, then the packet goes out via Ethernet to the network, and vice-versa.

With the switch system 300, in one approach, this complicated and expensive process is more ideally managed. In one embodiment, a single microchip 301 may include network Ethernet ports 310 and PCIe ports 306. One or more of the PCIe ports 306 may be used to connect to the local processor 302. Because the local processor 302 is not typically performing high levels of processing due to an external processor (of an external host 312 or 318) managing the switch system 300, the PCIe ports 306 may be used for connecting PCIe devices 312 to Ethernet and the network via the multiple switched Ethernet ports 310, in one approach. Therefore, the switch system 300 is able to switch between PCIe and Ethernet, along with other communications protocols.

According to one approach, the external host 312 or 318 may be connected via a PCIe port to the switch system 300. Furthermore, the external host 312 or 318 may be configured for performing functionality of a management plane and a control plane for the switch system 300 using a processor of the external host 312 or 318.

Generally, when I/O is processed, particularly I/O regarding FC or fibre channel over Ethernet (FCoE) for storage, such as for backing-up a file or system, a server utilizes PCIe to access a storage controller on a storage area network (SAN) which has storage, such as hard disk drives (HDDs), connected thereto. When any file is saved, PCIe is used into the storage controller and ultimately into the hard disk, or if the storage is external, then PCIe is used out into the network to access the storage. In the network, there is a mechanism called a Converged Network Adapter (CNA) that is configured to send Ethernet, as well as storage traffic. Accordingly, storage traffic proceeds over Ethernet, although there are multiple other modes. For simplicity it is assumed that Ethernet is used when storage traffic is received, it is converted into Ethernet, and is transmitted out onto the CNA. Again, the CNA may be rather expensive.

Referring again to FIG. 3, in order to simplify and bypass all of this, functionality is removed from the local processor 302, and may be provided instead by one or more external host(s) 312 (or 318 if connected via Ethernet), such as through a processor of the external host(s) 312/318. In order for this to happen, now that PCIe is available in the switch system 300, the external host(s) 312/318 may be configured for performing functionality of a management plane and at least partially performing functionality of a control plane for the switch system 300.

In another embodiment, the external host(s) 312/318 may be configured for programming the switching logic 308 of the switch system 300 to handle communications between devices 312 connected to the plurality of PCIe ports 306, devices 318 connected to the multiple switch Ethernet ports 310, and a first device 312 connected to a PCIe port 306 and a second device 318 connected to an Ethernet port 310, in some approaches.

According to various embodiments, functionality of the management plane may comprise at least one, any, or all of the following: command-line interface (CLI) over telnet operations, simple network management protocol (SNMP) agent operations, web server operations, telnet server/client operations, and/or trivial file transfer protocol (TFTP) server/client operations. Of course, this list is non-exhaustive, and other operations and/or functionality may also be performed by the external host 318/312. Functionality of the control plane may comprise at least one, any, or all of the following: processing network control packets, running networking protocols, and/or running platform software. Of course, this list is non-exhaustive, and other operations and/or functionality may also be performed by the external host 318/312.

The switch system 300 comprises the PCIe interface block 304 which is connected to and provides facility for the PCIe ports 306. However, the control of these PCIe ports 306 may be provided by at least one of the external host(s) 312/318, locally by the PCIe interface block 304, or through a combination of control by each of the at least one of the external host(s) 312/318 and the PCIe interface block 304.

In one embodiment, a switch system 300 comprises a PCIe interface block 304 coupled to a plurality of PCIe ports 306, the plurality of PCIe ports 306 being adapted for coupling to one or more external PCIe hosts 312, multiple switched Ethernet ports 310 adapted for coupling to one or more external Ethernet hosts 318, switching logic 308 adapted for switching the multiple switched Ethernet ports 310 and the PCIe interface block 304 (and ultimately the plurality of PCIe ports 306), and a local processor 302 coupled to the PCIe interface block 304.

In one embodiment, the external host(s) 312/318 may be configured for communicating to the PCIe interface block 304 via. DMA 316. DMA 316 may be used for transferring packets through the switching logic 308 from/to the PCIe interface block 304, from/to memory of the external host(s) 312/318, and/or from/to memory of any external devices 312 coupled via PCIe and external devices 318 coupled via Ethernet, regardless of the packet type, e.g., Ethernet packets, FCoE packets, PCIe-over-Ethernet packets, etc.

In another embodiment, the plurality of PCIe ports 306 may allow communications to the one or more external PCIe devices 312 via one or more external PCIe lanes 320 based on a desired communication bandwidth. Furthermore, at least one of the PCIe interface block 304 and the switching logic 308 may be configured for allowing communications between an external PCIe device 312 and any other external PCIe device 312 through the plurality of PCIe ports 306 and/or an external Ethernet device 318 through the multiple switched Ethernet ports 310. In addition, in one approach, at least one of the PCIe interface block 304 and the switching logic 308 may be configured for allowing communications between an external Ethernet device 318 and any other external Ethernet device 318 through the multiple switched Ethernet ports 310 and/or an external PCIe device 312 through the plurality of PCIe ports 306.

In another approach, the external host(s) 312/318 may be configured for communicating via any communications protocol that is supported by the switch system 300 via DMA 316, such as Ethernet, FCoE, PCIe-over-Ethernet, etc., as would be known to one of skill in the art. This may be accomplished by creating a protocol packet and payload and copying the protocol packet into a switch memory via DMA for switching to an intended destination per the communications protocol.

In another embodiment, the external host(s) 312/318 may be configured for mounting the switch system 300 in local PCIe address space of the external host(s) 312/318.

According to another embodiment, one external host 312/318 may be configured for sharing the functionality of the management plane and the control plane with one or more other external hosts 312/318 directly connected to the PCIe interface block 304.

The at least one external host 312/318 may then control some or all operations of the switch system 300, as would be understood by one of skill in the art upon reading the present descriptions.

In another embodiment, a system may comprise the switch system 300 and an external PCIe host 312 coupled to at least one of the plurality of PCIe ports 306, the external PCIe host 312 being configured for performing the functionality of the management plane and the control plane of the switch system 300.

According to some embodiments, multiple generations of PCIe may be supported through the PCIe ports 306, such as Generation 1, Generation 2, Generation 3, and any future generations. The different generations may be capable of different bandwidths of data transfer, as would be known to one of skill in the art. In order to achieve more bandwidth from a PCIe generation that is not capable of the desired bandwidth, multiple lanes may be clumped or bundled together, e.g., using LAG. For example, generally single lanes of PCIe (×1) may be provided. However, to increase bandwidth, 4 lanes (×4), 8 lanes (×8), etc., may be provided.

Figure 4:
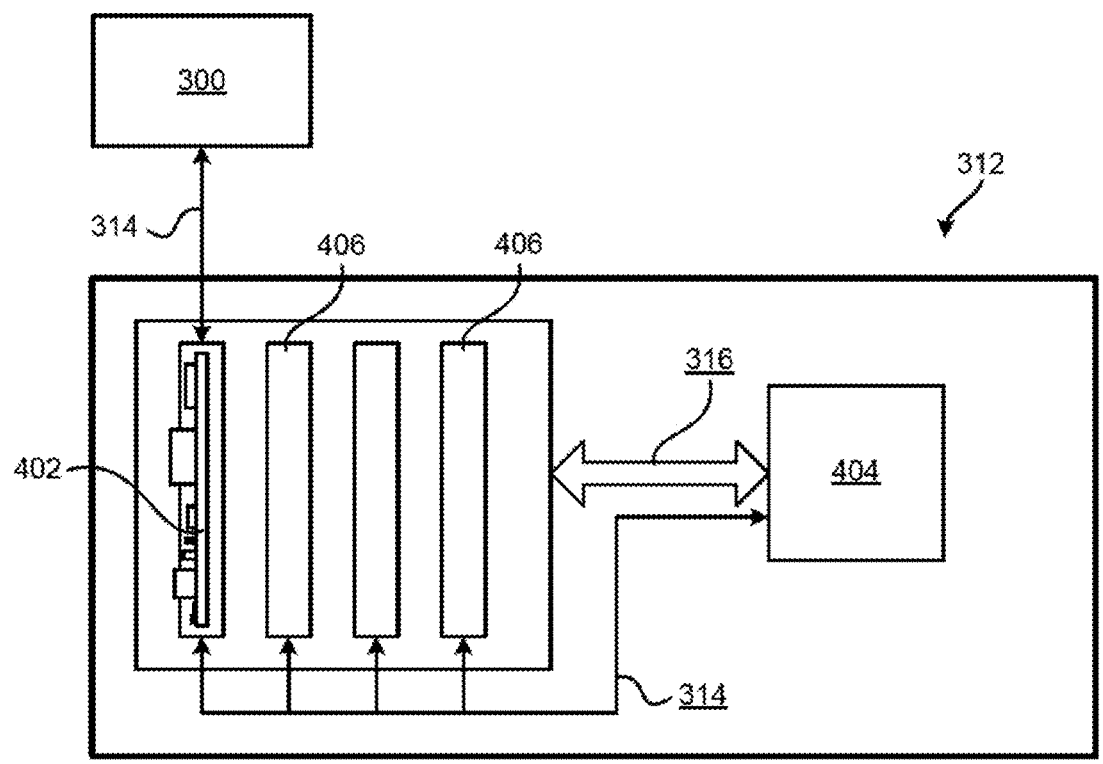
FIG. 4 is a simplified diagram of a host system for connecting to the switch system, according to one embodiment.

Now referring to FIG. 4, an external PCIe host 312 is shown according to one embodiment that is configured to connect to one of the PCIe ports 306 of the switch system 300. In order to simplify the CNA mechanism, PCIe connectivity is provided through the switch system 300, in one approach, as described previously. Therefore, on the external PCIe host 312, a pass-through PCIe adaptor 402 is installed in one of the PCIe card slots 406 on the external PCIe host 312 in order to communicate with the switch system 300. This pass-through PCIe adaptor 402 may be controlled by the external host's processor 404, which may be any processor known in the art and/or as described herein. When the external PCIe host 312 attempts to access the network through the switch system 300, the network may not be visible to the external PCIe host 312; instead, the external PCIe host 312 sees a NIC on the PCI bus. This NIC (which is part of the switch system 300) is connected to the Ethernet network, and that is how the external PCIe host 312 accesses the network, according to one approach. The external processor 404 may communicate through the PCIe pass-through adaptor 402 via DMA logic 316 in order to provide a reliable and fast transfer connection, in one embodiment.

In this way, when the PCI lane(s) 320 are provided on the switch system 300 to an external PCIe host 312, the CNA is no longer needed and may be removed from the system, leaving a very simple PCIe connection.

Referring now to FIGS. 3-4, in order for this to function properly, the PCIe bus 314 from the external processor 404 connects through to the switching logic 308 of the switch system 300. Therefore, a pass-through PCIe adaptor 402 or multiple PCIe adaptors is/are positioned in one or more PCIe card slots 406 in the external PCIe host(s) 312, those PCIe ports 406 are coupled to one or more PCIe ports 306 on the switch system 300. Therefore, the external processor 404 is connected to the PCIe bus 314 and is configured for performing functionality of the management plane and the control plane for the switch system 300.

In this way, in one approach, there is a DMA logic 316 mechanism between the PCIe bus 314 and the switching logic 308. When the DMA logic 316 is being utilized, at least a portion of the switch memory and at least a portion of the external processor 404 memory are available for use on the PCIe bus 314 and they may be directly written by or to one other, along with memory of any other external devices 312/318. The external processor 404 may write directly into the switch system 300 memory, or the switch system 300 may directly write into the external host 312 memory. There may be no restriction as to how this memory may be shared. It does not need to be distributed across only these connections, as it may be only processor-based, so the external processor 404 may reserve some memory space, such as DMA memory, and this is where the external processor 404 may read/write. Both the switch system 300 and the external processor 404 may write or read into that designated memory and they may have visibility with each other through the PCIe bus 314.

Since the external processor 404 on one, some, or any PCIe host 312 may be configured for programming the switching logic 308 of the switch system 300 directly, if the external processor 404 is to be used to send any packet, the external processor 404 (or application that is finning on the external processor 404) creates an Ethernet packet, or creates a payload which uses a file transfer protocol (FTP) protocol data unit (PDU). The FTP packet may be processed to become an internet protocol (IP) packet, the IP packet may be processed to become an Ethernet packet, and when the Ethernet packet is ready, it may be written into the DMA 316 and may be sent out. Therefore, in this way, when the packet (regardless of what kind of packet it is, e.g., IP packet, Ethernet packet, etc.) is transferred into the switch system 300 (via the DMA logic 316), the switch system 300 may treat the packet as any other IP packet, and it may perform any pre-classification and processing of that packet, including any special services that are required, and then the switch system 300 may send it to the appropriate system, such as a server, host, computer, another switch, etc. Accordingly, the switching logic 308 may be basically the same as in standard switches, as the packet is received and regular services are performed.

If the switch supports FCoE functionality, the pass through PCIe adaptor 402 may act as a CNA for the host, where the host can then DMA FCoE packets onto the switch 300 for switching. This allows for FCoE, FC, and/or other special storage services to be processed by the switch system 300 and for switching operations to be performed on these protocols which would otherwise require a CNA and all the functionality of the CNA. This is possible because the external processor 404 is capable of processing all the switching functionality that would otherwise be performed in a CNA.

In one example, if an FCoE packet is to be sent by the external processor 404, an FCoE packet may be created by the external processor 404, the DMA memory may be written to by the external processor 404 and the switch system 300 may be made aware of the FCoE packet, and then the FCoE packet may be sent to the switch system 300 by the external processor 404. The switch system 300 receives the FCoE packet, recognizes and treats the FCoE packet as FCoE since it is an FCoE packet and it was made aware that a FCoE packet would be arriving, and then may switch it out as an FCoE packet.

In this manner, the cost and complexity of storage and networking may be reduced significantly compared to conventional systems utilizing a CNA to switch between FCoE or FC and Ethernet. Furthermore, the complexity of providing new storage or I/O protocols is reduced compared to conventional systems.

In addition, in another embodiment, PCIe-over-Ethernet may be controlled using the external processor 404. When using PCIe-over-Ethernet, a PCIe payload, which may be a direct local controlled plane payload, is created. The PCIe payload is encapsulated into Ethernet, and the resulting Ethernet packets become PCIe-over-Ethernet. Therefore, there may be a different Ether type to identify that the PCIe-over-Ethernet packet contains a PCIe payload, and that payload goes over Ethernet.

The external processor 404 has a PCIe connection through the switch system 300, but this connection is being virtualized. One illustrative virtualization technique is called multi-route I/O virtualization (MRIOV), and another is called single route I/O virtualization (SRIOV). In order to provide these facilities, the external processor 404 virtualizes multiple devices connected thereto, even though the devices do not need to be physically connected to the external processor 404 or the external host 312. When the system is running, it has multiple virtual machines (VMs) and one hypervisor. Each VM, when pinning, should determine that it has necessary resources on the external processor 404, e.g., resources in terms of I/O busses, processing power, storage power, and anything else that the VM might require. The underlying hypervisor provides those facilities that the VM deems needed, but preferably only when the VM checks if the resources are available. The hypervisor, when connected to the switch system 300, such as through one or more of the plurality of PCIe ports 306, is able to view many busses connected thereto, the number depending on the configuration.

By the virtue of PCIe-over-Ethernet being utilized, the external processor 404 and the hypervisor not only see devices connected to the local PCIe ports 406, but also any other PCIe devices 312/318 on the network connected through the PCIe interface block 304 or the multiple switched Ethernet ports 310 connected through PCIe-over-Ethernet. However, the connection to these devices, even though as appearing to be PCIe, may actually be over Ethernet via PCIe-over-Ethernet; but the external processor 404 does not distinguish between PCIe-over-Ethernet, direct PCIe or anything else, it just determines that there are other PCIe devices available over the network, and it can provide access between these devices.

This may cause the MRIOV mechanism to become a bit more complex, but there are more PCIe devices out there that the external processor 404 may provide to its local VMs.

According to various embodiments described herein, the switching logic 308 is unchanged from conventional switching logic. Instead of changing the switching logic 308 to facilitate the connections, the same conventional chipset may be used, except it may be used differently, in a different manner.

In this way, the external processor 404 is capable of providing switching facility for Ethernet, PCIe, PCIe-over-Ethernet, FC, FCoE, and other special system storage protocols as known in the art, through the pass-through PCIe adaptor 402 on the external host 312.

In one embodiment, the switch system may be packaged in an enclosure having a rack size of 1U, 2U, or larger. The enclosure may comprise any suitable material, such as aluminum, steel, and other suitable metals, polymer, plastic, rubber, and combinations thereof, as would be known by one of skill in the art. The connections to the multiple switched Ethernet ports 310 and the plurality of PCIe ports 306 may be provided through the enclosure via cutouts, windows, holes, etc., in some approaches.

In more approaches, the multiple switch Ethernet ports 310 may be capable of various bandwidths, such as 10G, 40G, 100G, etc., in the same switch system 300 or across multiple switch systems 300 used in a larger overall networked system.

Of course, any of the functionality and/or logic described herein may be incorporated into a computer program product. In one such embodiment, a computer program product comprises a computer readable storage medium having computer readable program code embodied therewith. The computer readable program code comprises computer readable program code configured for performing functionality of a management plane and a control plane for a switch system using a processor of an external host.

In more approaches, the computer program product may further comprise computer readable program code configured for providing a DMA facility between the first external host and switching logic of the switch system, wherein the first external host is coupled to the switch system via one or more PCIe ports.

In more embodiments, the computer program product may further comprise computer readable program code configured for receiving first Ethernet packets through the switch system from a second external host coupled to an Ethernet port of the switch system, computer readable program code configured for sending second Ethernet packets from the first external host to the switch system, and computer readable program code configured for sending the second Ethernet packets to the second external host through an Ethernet port of the switch system.

In additional approaches, the computer program product may further comprise computer readable program code configured for programming the switching logic of the switch system to handle communications between hosts connected to the plurality of PCIe ports using DMA, hosts connected to the multiple switch Ethernet ports, and a first host connected to a PCIe port and a second host connected to an Ethernet port.

In some approaches, the computer program product may further comprise computer readable program code configured for communicating via any communications protocol that is supported by the switch system via DMA, such as by creating protocol packets and application payload and copying the protocol packets via DMA into a switch memory for switching thereof. Additionally, the computer program product may further comprise computer readable program code configured for sharing the functionality of the management plane and the control plane with one or more other external hosts directly connected to a PCIe interface block of the switch system.

Figure 5:
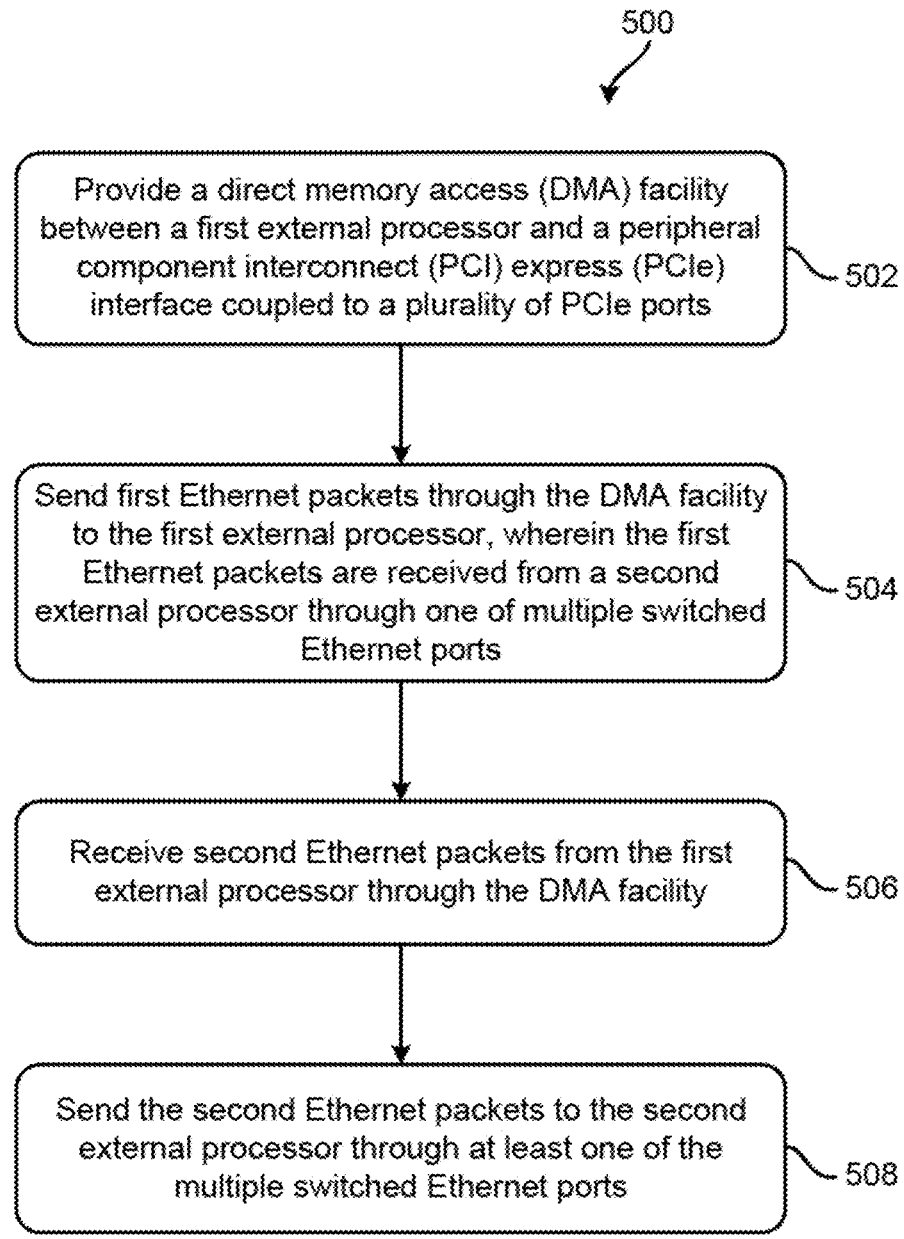
FIG. 5 is a flowchart of a method, according to one embodiment.

Now referring to FIG. 5, a method 500 is shown according to one embodiment. The method 500 may be carried out in any desired environment, including those described herein and others as would be known in the art. Also, more or less operations than those described in FIG. 5 may be included in method 500 according to various embodiments. Of course, one of skill in the art may envision different embodiments and/or approaches than those described herein, and these may be included in the method 500 as well.

In operation 502, a DMA facility is provided between memory of a first external processor and memory of a switch system through a PCIe interface coupled to a plurality of PCIe ports. Any method of providing the DMA facility may be used as would be known in the art, such as on an IC dedicated to providing the DMA facility or any other method.

In operation 504, first Ethernet packets are sent through the DMA facility to the first external processor. The first Ethernet packets are received from a second external processor through one of multiple switched Ethernet ports. For example, the Ethernet packets may be received by a switch system from an Ethernet host or server coupled to the switch system through an Ethernet port of the switch system, in one approach.

In operation 506, second Ethernet packets are received from the first external processor through the DMA facility. For example, in one approach, the Ethernet packets may be sent by the first external processor, which may be coupled to any port of the switch system, such as an Ethernet port, a PCIe port, etc. The second Ethernet packets may use the same protocol as the first Ethernet packets, or may use a different protocol, such as FCoE, PCIe-over-Ethernet, Ethernet, etc.

In operation 508, the second Ethernet packets are sent to the second external processor through at least one of the multiple switched Ethernet ports. In this way, communications are possible between the first external processor and the second external processor, regardless of the connection types, e.g., Ethernet, FC, PCIe, etc.

In method 500, the switch system may comprise the DMA facility, the PCIe interface, the multiple switched Ethernet ports, and the plurality of PCIe ports.

In another embodiment, the method 500 may include handling communications to/from the first external processor via one or more external PCIe lanes based on a desired communication bandwidth. In this way, 4, 8, or more PCIe lanes may be bundled together in order to increase bandwidth to the first external processor. These communications may be provided for through switching logic of a switch system, in one embodiment.

In another embodiment, the method 500 may include handling communications between the first external processor and any other external processor through the plurality of PCIe ports and/or through the multiple switched Ethernet ports. These communications may be provided for through switching logic of a switch system, in one embodiment.

According to another embodiment, the method 500 may include handling communications between the second external processor and any other external processor through the multiple switched Ethernet ports and/or the plurality of PCIe ports. These communications may be provided for through switching logic of a switch system, in one embodiment.

In one approach, the method 500 may include controlling the sending and receiving of Ethernet packets through the DMA facility using the first external processor by mounting the switch system in an address space of the first external processor. In this way, the switch system may be controlled, at least partially, by the first external processor which frees up the local processor of the switch system to perform other tasks.

In yet another embodiment, the method 500 may include controlling the sending and receiving of Ethernet packets through the DMA facility using the second external processor by mounting the DLC system in an address space of the second external processor. In this way, the switch system may be controlled, at least partially, by the second external processor which frees up the local processor of the switch system to perform other tasks.

In one approach, the method 500 may include controlling the sending and receiving of Ethernet packets through the DMA facility using both the first external processor and the second external processor, and possibly using other external processors, in more approaches.

In another approach, the method 500 may include using the first and/or second external processor to control at least one of a PCIe control plane for switching mechanisms, switching of the multiple switched Ethernet ports, and switching of the plurality of PCIe ports, as described herein in various embodiments.

There are numerous advantages to using the various embodiments and approaches described herein. Some of those advantages include a low cost integrated NIC which may act as a NIC, FCoE, soft CNA, and/or PCIe-over-Ethernet card, methods to simplify network convergence, methods to reduce total cost of CNA and PCIe-over-Ethernet using existing switching chips, and a mechanism which allows external hosts to control Ethernet switches thus creating external control planes. Of course, more advantages may exist which are not specifically described herein, but may be apparent to one of skill in the art upon reading the present descriptions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   an external host connected via a peripheral component interconnect express (PCIe) port to a switch system, the external host being configured to perform functionality of a management plane and a control plane for the switch system, the external host comprising;
   a processor, and
   a pass-through PCIe adaptor coupled to the switch system via a PCIe port,
   wherein the external host is configured to communicate via any communications protocol that is supported by the switch system via direct memory access (DMA) by creating a protocol packet and payload and copying the protocol packet into a switch memory via DMA for switching to an intended destination per the communications protocol.

2. The system as recited in claim 1,
   wherein functionality of the management plane comprises at least one of:
   command-line interface (CLI) over telnet operations;
   simple network management protocol (SNMP) agent operations;
   web server operations;
   telnet server/client operations; and
   TFTP server/client operations, and
   wherein functionality of the control plane comprises at least one of:
   processing network control packets;
   running networking protocols; and
   running platform software.

3. The system as recited in claim 1, further comprising the switch system, wherein the switch system comprises:
   a PCIe interface block coupled to a plurality of PCIe ports, the plurality of PCIe ports configured to couple to one or more external PCIe devices, wherein the PCIe interface block comprises logic configured to provide direct memory access (DMA) for each PCIe lane thereof;
   multiple switched Ethernet ports configured to couple to one or more external Ethernet devices;

switching logic configured to switch between the multiple switched Ethernet ports and the plurality of PCIe ports; and a local processor coupled to the PCIe interface block.

4. The system as recited in claim 3, wherein the PCIe ports are configured to couple with an external device via one or more external PCIe lanes based on a desired communication bandwidth.

5. The system as recited in claim 3, wherein the external host is configured to program the switching logic of the switch system to handle communications between devices connected to the plurality of PCIe ports, devices connected to the multiple switch Ethernet ports, and a first device connected to a PCIe port and a second device connected to an Ethernet port.

6. The system as recited in claim 1, wherein the external host is configured to mount the switch system in the external host's local PCIe address space.

7. The system as recited in claim 1, wherein the external host is configured to share the functionality of the management plane and the control plane with one or more other external hosts directly connected to the PCIe interface block.

8. A computer program product comprising a computer readable storage medium having computer readable program code embodied therewith, the computer readable program code comprising:

computer readable program code configured to perform functionality of a management plane and a control plane for a switch system using a processor of an external host, wherein the switch system comprises:

a peripheral component interconnect express (PCIe) interface block coupled to a plurality of PCIe ports, the plurality of PCIe ports configured to couple to one or more external PCIe devices, wherein the PCIe interface block comprises logic configured to provide direct memory access (DMA) for each PCIe lane thereof;

multiple switched Ethernet ports configured to couple to one or more external Ethernet devices;

switching logic configured to switch between the multiple switched Ethernet ports and the plurality of PCIe ports using DMA; and a local processor coupled to the PCIe interface block, wherein the external host comprises a pass-through PCIe adaptor coupled to the switch system via a PCIe port.

9. The computer program product as recited in claim 8, further comprising computer readable program code configured to provide a DMA facility between the first external host and switching logic of the switch system, wherein the first external host is coupled to the switch system via one or more PCIe ports.

10. The computer program product as recited in claim 8, further comprising:

computer readable program code configured to receive first Ethernet packets through the switch system from a second external host coupled to an Ethernet port of the switch system;

computer readable program code configured to send second Ethernet packets from the first external host to the switch system; and computer readable program code configured to send the second Ethernet packets to the second external host through an Ethernet port of the switch system.

11. The computer program product as recited in claim 8, further comprising computer readable program code configured to program the switching logic of the switch system to handle communications between devices connected to the plurality of PCIe ports using DMA, devices connected to the multiple switch Ethernet ports, and a first device connected to a PCIe port and a second device connected to an Ethernet port.

12. The computer program product as recited in claim 8, further comprising computer readable program code configured to communicate via any communications protocol that is supported by the switch system via DMA by creating protocol packets and application payload and copying the protocol packets via DMA into a switch memory for switching.

13. The computer program product as recited in claim 8, further comprising computer readable program code configured to share the functionality of the management plane and the control plane with one or more other external hosts directly connected to a PCIe interface block of the switch system.

14. A system, comprising:

a switch system, comprising:

a peripheral component interconnect express (PCIe) interface block coupled to a plurality of PCIe ports, the plurality of PCIe ports configured to couple to one or more external PCIe devices, wherein the PCIe interface block comprises logic configured to provide direct memory access (DMA) for each PCIe lane thereof;

multiple switched Ethernet ports configured to couple to one or more external Ethernet devices;

switching logic configured to switch between the multiple switched Ethernet ports and the plurality of PCIe ports; and a local processor coupled to the PCIe interface block, wherein the external host comprises a pass-through PCIe adaptor coupled to the switch system via a PCIe port, and wherein the switch system is a distributed line card (DLC) system comprising a plurality of fabric ports and logic for switching the plurality of fabric ports.

15. The system as recited in claim 14, further comprising:

an external PCIe host coupled to at least one of the plurality of PCIe ports of the switch system, the external PCIe host comprising a pass-through PCIe adaptor and being configured to perform functionality of a management plane and a control plane for a switch system, wherein functionality of the management plane comprises at least one of:

command-line interface (CLI) over telnet operations;

simple network management protocol (SNMP) agent operations;

web server operations;

telnet server/client operations; and

TFTP server/client operations, and wherein functionality of the control plane comprises at least one of:

processing control protocol packets;

running networking protocols; and running platform software, wherein the external host is configured to program the switching logic of the switch system to handle communications between hosts connected to the plurality of PCIe ports, hosts connected to the multiple switch Ethernet ports, and a first host connected to a PCIe port and a second host connected to an Ethernet port, and wherein the external host is configured to communicate via any communications protocol that is supported by the switch system via DMA.

16. A system, comprising:
an external host coupled to either a peripheral component interconnect express (PCIe) port or an Ethernet port of a switch system, the external host being configured to perform functionality of a management plane and a control plane for a switch system, the external host comprising a processor,
wherein the external host is configured to program the switching logic of the switch system to handle communications between devices connected to the plurality of PCIe ports, devices connected to the multiple switch Ethernet ports, and a first device connected to a PCIe port and a second device connected to an Ethernet port, and
wherein the external host is configured to communicate via any communications protocol that is supported by the switch system via direct memory access (DMA) by creating a protocol packet and payload and copying the protocol packet into a switch memory via DMA for switching to an intended destination per the communications protocol.

17. The system as recited in claim 16, wherein the external host is configured to share the functionality of the management plane and the control plane with one or more other external hosts directly connected to a PCIe interface block of the switch system, and wherein each external host is configured to access memory of the other external hosts.

\* \* \* \* \*